United States Patent Office 3,357,688
Patented Dec. 12, 1967

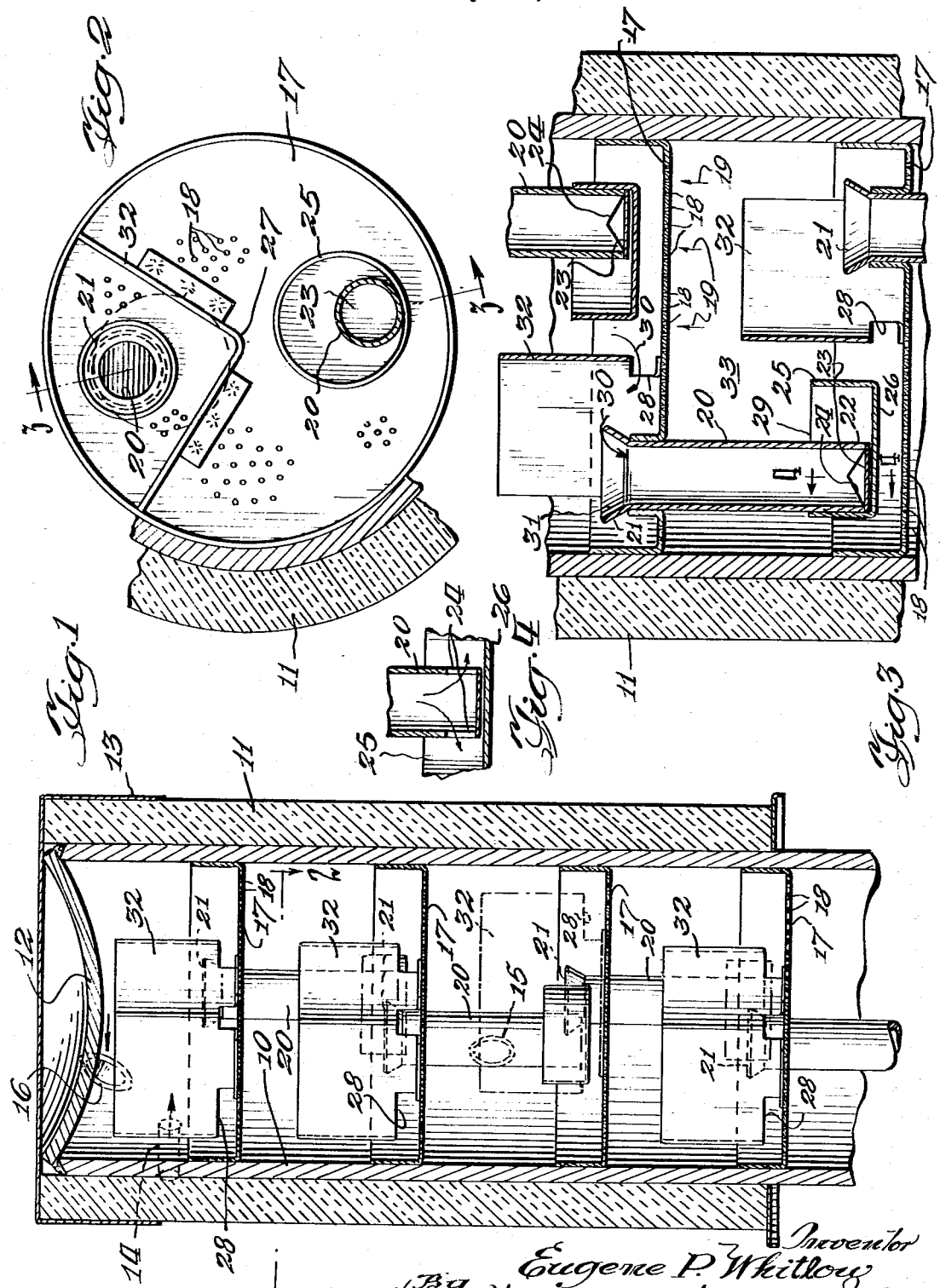

3,357,688
RECTIFIER FOR ABSORPTION REFRIGERATION SYSTEM
Eugene P. Whitlow, St. Joseph, Mich., assignor to Whirlpool Corporation, a corporation of Delaware
Filed Apr. 9, 1964, Ser. No. 358,514
3 Claims. (Cl. 261—114)

This invention relates to a rectifier suitable for limited space installation and functioning to separate solvent vapor from refrigerant vapor.

The rectifier of this invention is especially useful in absorption refrigeration systems for providing substantially water free refrigerant gas by passing the gas upwardly from a lower relatively hot zone to an upper relatively cool zone while flowing the liquid countercurrently in contact with the gas. However, the invention can be used in any installation where a rectifier of this type is required.

The rectifier constructed according to the principles of this invention can be made quite compact so that it can be installed in relatively limited space such as that available in an absorption refrigeration system.

One of the features of this invention is to provide an improved rectifier for separating solvent vapor from refrigerant vapor in a continuous manner in which accidental reverse flow of the liquid is prevented or materially inhibited because of overheating of the descending liquid.

Other features and advantages of the invention will be apparent from the following description of one embodiment of the invention as illustrated in the accompanying drawings. Of the drawings:

FIGURE 1 is a fragmentary vertical sectional view through the tower of a rectifier embodying the invention.

FIGURE 2 is a fragmentary horizontal sectional view taken substantially along line 2—2 of FIGURE 1.

FIGURE 3 is a fragmentary sectional view taken substantially along line 3—3 of FIGURE 2.

FIGURE 4 is a fragmentary vertical sectional view taken substantially along line 4—4 of FIGURE 3.

The rectifier shown in the accompanying drawings comprises a vertical generally cylindrical tower 10 of the type used in the absorption refrigeration system generator described and claimed in my copending Patent No. 3,254,507, issued June 7, 1966, assigned to the same assignee as the present application.

The tower 10 is generally cylindrical and is provided with an outer covering 11 of heat insulating material such as glass fiber. The tower is provided with a dished upper end 12 and the top of the tower, as well as the top of the insulation 11, is enclosed by a cap 13. The tower is provided with an upper entrance connection 14 for incoming liquid, specifically an aqueous solution of a refrigerant gas such as ammonia, and an intermediate entrance fitting 15 for an aqueous solution of ammonia. The tower is also provided with a bottom heater (not shown) of the type illustrated in the above-mentioned copending patent for boiling the dissolved ammonia gas or the like from the liquid. In this type of heating system the hot zone is at the bottom of the tower with the temperature progressively decreasing toward the top. The tower is also provided with an exit fitting 16 adjacent the top for the substantially solvent free gas and a bottom receiver (not shown) for solution.

When this type of rectifier is used in an absorption refrigeration system strong liquid which is customarily an aqueous solution of ammonia containing a large amount of dissolved ammonia enters at 14 and 15 while ammonia gas exits at 16 and an aqueous solution containing relatively small amounts of ammonia flows from the bottom of the tower as illustrated in the above-mentioned copending application.

Within the tower are provided a plurality of spaced liquid retaining but gas permeable plates 17 containing small openings 18, as illustrated in FIGURES 2 and 3, through which gas may flow in an upward direction, as illustrated by the arrows 19, against the head of liquid on the plates 17.

A downcomer tube 20 is provided in each plate 17 having an open upper end 21 of funnel shape above its plate 17 to receive overflow liquid (not shown) from its plate into this open end. Each tube 20 has a lower end 22 adjacent the next lower plate 17 but spaced therefrom. The lower end 22 of each tube 20 is closed by a small plate 23 attached thereto but discharge of liquid from this lower end is provided for by a pair of diametrically opposed side openings 24 immediately above the closure plate 23.

The lower end of each tube 20 is enclosed by a cup 25 attached to this lower end and of larger diameter than that of the tube 20. The closure plate 23 on the end of the tube is spaced from the bottom 26 of the cup a small distance while the cup bottom 26 itself is spaced above the adjacent plate 17.

The upper end 21 of each tube 20 is enclosed by a baffle 32 of generally V shape in horizontal cross section as shown in FIGURE 2. The ends of each baffle are attached to the tower 10, as shown in FIGURE 2, and the vertical apex 27 of each baffle is open at the bottom, as indicated at 28 in FIGURE 3, to provide liquid access to the tubes 20.

As is shown in FIGURE 3 the upper edge 29 of each cup 25 is above the side openings 24 in the lower end of the tube. The liquid openings 28 in the baffles 32 are all below the upper ends 21 of the corresponding tubes.

With this arrangement liquid on each plate 17 flows through the corresponding opening 28 in the baffle 32, as indicated by the arrows 30, and overflows the top of the funnel shaped upper end 21. The baffle 32 having the opening 28 beneath the upper edge of the tube serves to hold back foam floating on top of the liquid so that only small amounts of this foam are conveyed down the tubes by the liquid. This foam, of course, is produced primarily by the gases flowing upwardly through the liquid on the plates.

The downflowing liquid in each tube 20 then flows laterally out the side openings 24 in each tube into the corresponding cup 25. The liquid thereupon flows over the edge 29 of each cup onto the plate 17 immediately therebelow.

In the meantime the gas is boiled out of the liquid and flows upwardly through the openings illustrated at 18 in each plate 17 and through the liquid on each plate which is normally slightly above the upper edge 31 of the upper end 21 of each tube. This flow of gas (ammonia) through the liquid removes solvent (water) from the gas so that substantially solvent free gas flows from the tower through the exit fitting 16 at the top of the tower 10.

With this arrangement liquid flows down the tower from one plate to the other through the tubes 20. As the gas flows upwardly in the tower through the openings 18 from one plate to the other the gas becomes dryer. This is caused by the scrubbing effect on the gas flowing upwardly through the plate openings 18 and bubbling through the solution on the plate.

The rectifier of this invention, as mentioned earlier, is ideally adapted for limited space as the length of the downcomer tube can be kept quite short without danger of liquid in the tubes becoming overheated at the bottom and boiling back up the tubes in a reverse direction. This reverse boiling is customarily caused by the fact that the liquid on successively lower plates 17 is hotter than on the preceding plate and that the successively lower spaces 33 between the plates 17 also becomes hotter when progressing from the top to the bottom of the tower. Another factor causing back boiling is the increasing vapor pressure in the successively lower spaces 33.

This back boiling was prevented, while still maintaining the relatively short length of the tube 20 which in one installation was only four inches, by insulating the bottom 23 of each tube 20 from its cup 25 and from the next lower plate 17. In addition, reverse flow up each tube 20 was prevented by positioning of the side openings 24. With this arrangement, any boiling within the cup 25 takes place around the sides of the tube instead of back up the interior of the tube. The insulating effects at the bottom of each tube 20 are provided by spacing the bottom of each cup 26 from its corresponding plate 17 so as to prevent direct heat transfer therebetween. Further insulation is provided by spacing the closure plate 23 at the bottom of each tube 20 from the corresponding cup bottom 26 in order to prevent direct heat transfer therebetween.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A rectifier suitable for limited space and functioning to separate solvent vapor from refrigerant vapor, comprising: a tower; a plurality of vertically spaced liquid retaining but gas permeable plates in said tower; a downcomer tube extending through each plate and maintaining a liquid level on each plate, each downcomer tube having an open upper end above its plate to receive overflow liquid from its said plate into said open end, and a liquid discharging lower end adjacent the next lower plate but spaced thereabove; means closing the lower end of each downcomer tube, and means providing lower end side passages from each downcomer tube, said side passages extending above said lower end closing means; a cup enclosing said lower end to receive liquid therefrom, said cup having a top edge above the liquid level on said lower plate and a bottom below the liquid level on said lower plate, whereby the liquid flows laterally from said side passages into said cup and flows over the cup top edge onto said lower plate.

2. The rectifier of claim 1 wherein said cup bottom is spaced from said tube lower end closing means to inhibit heating of said lower end by heat received from said cup bottom.

3. The rectifier of claim 1 wherein said cup is spaced from said lower plate to prevent direct heating of said cup by heat received from said lower plate and wherein said cup has a bottom spaced from said tube lower end closing means to inhibit heating of said lower end by heat received from said cup bottom.

References Cited

UNITED STATES PATENTS

| | | | |
|---|---|---|---|
| 1,598,601 | 9/1926 | Caspar | 99—44 |
| 1,741,519 | 12/1929 | Huff | 261—114 |
| 1,770,658 | 7/1930 | Kremser | 261—114 |
| 1,876,179 | 9/1932 | Tindall | 261—114 |
| 2,061,830 | 11/1936 | Campbell | 261—113 |
| 2,759,985 | 8/1956 | Root | 261—113 XR |
| 3,136,826 | 6/1964 | Irons | 261—114 XR |
| 3,293,149 | 12/1966 | Lengemann et al. | 261—114 XR |

HARRY B. THORNTON, *Primary Examiner.*

E. H. RENNER, *Assistant Examiner.*